INVENTOR.
ROBERT A. HENLE
BY [signature]
ATTORNEY

United States Patent Office 3,441,912
Patented Apr. 29, 1969

3,441,912

FEEDBACK CURRENT SWITCH MEMORY CELL

Robert A. Henle, Hyde Park, N.Y., assignor to International Business Machines Corporation, Armonk, N.Y., a corporation of New York Filed Jan. 28, 1966, Ser. No. 523,678
Int. Cl. G11b 13/00
U.S. Cl. 340—173 12 Claims This invention relates to a memory or storage device, and more particularly, to a transistor memory cell that embodies the principle of a feedback current switch, and which may be employed in memory systems.

A variety of devices have heretofore been proposed for the memory systems of computers and data-handling machines in general. Among these devices are the magnetic core, the cryotron and the tunnel diode. The essential criterion for the application of these devices to memory systems is that they be capable of storing a bit of digital information, that is, either a "0" or a "1," as defined by distinct electrical or magnetic states for these devices.

Although the conventional junction transistor has found extensive use in a great variety of electronic circuits because of its advantages of small size, low power losses, sturdiness, etc. this device has not been found heretofore to be cheap enough, in terms of cost per bit of information to be stored, to be adapted to large scale memory systems. Among other reasons for such lack of use is the fact that the conventional junction transistor does not, in and of itself, provide distinct stable states, that is, well defined and distinct electrical operating conditions. It is necessary, in order to achieve bistability to connect a pair of these transistors together and to provide appropriate regenerative feedback means.

Recent developments in the semiconductor art which hold out great promise for the more widespread use of semiconductor devices are the so called integrated circuit techniques, and more particularly, those known as monolithic integrated circuit techniques, by which is meant the fabrication of tremendous numbers of semiconductor devices within a block or monolith of semiconductor material. Such assemblies of devices are conventionally achieved by means of the diffusion technology which can produce a great number of discrete active devices by a sequence of masked diffusion steps performed in such way as to leave the devices in place within the monolith but electrically isolated from each other. By virtue of interconnection patterns formed on the surface of the monolith, the discrete devices may be linked together in various circuit configurations.

Crucial to the efficacious use of such monolithic techniques is the feasible design of simple enough circuitry such that the potential packing density that can be realized by such monolithic techniques may be fully exploited. Without simplicity of circuit design the interconnection pattern problem will forestall the potential gain in packing density.

A form of feedback current switch, which is suitable for implementation by monolithic integrated circuit techniques and which may be advantageously arranged to serve as a memory cell, has been disclosed before, and a description may be obtained by reference to copending application Ser. No. 523,614 filed Jan. 28, 1966, and assigned to the assignee of the present application. However, the previously developed memory cell, as described in the aforesaid application requires relatively large amplitude voltages applied to either the emitter resistor or the base of one of the transistors of the memory cell to reset the cell.

Accordingly, it is the primary object of the present invention to provide an extremely simple memory cell readily implemented by monolithic techniques of semiconductor device fabrication, but to realize the optimum in high speed reset of the cell.

The memory cell of the present invention is simply constructed incorporating only one additional transistor in the basic feedback current switch. The added transistor has its emitter connected in common with the emitters of the bistable elements of the memory cell. The bistable elements comprise a pair of transistors having direct coupling from the collector of only one of the pair to the base of the other transistor. The term "direct coupled" when used with respect to transistor circuitry refers to the fact that there are no impedance elements, such as resistance or capacitance, present in the coupling or connection from one point to another.

In accordance with one particular embodiment of the memory cell, the collector of the added transistor is separated from the collector of one of the transistors of the bistable pair and only the collector current flowing in the added or reset transistor is fed into the sense line. Since this current flows only during some portion of the reset pulse such arrangement enables extremely simple sense amplifier circuitry requiring only a fixed threshold sense circuit.

In accordance with another feature of the present invention the memory cell, in any of its several embodiments, is connected with a plurality of identical elements to provide a complete memory system. Such system may be arranged as a "bit organized" memory as described in detail hereinafter.

The novel features and the advantages of the present invention, both as to its organization and method of operation, will be best understood from the accompanying description taken in connection with the accompanying drawings, in which like characters refer to like parts, and in which.

Figure 1:
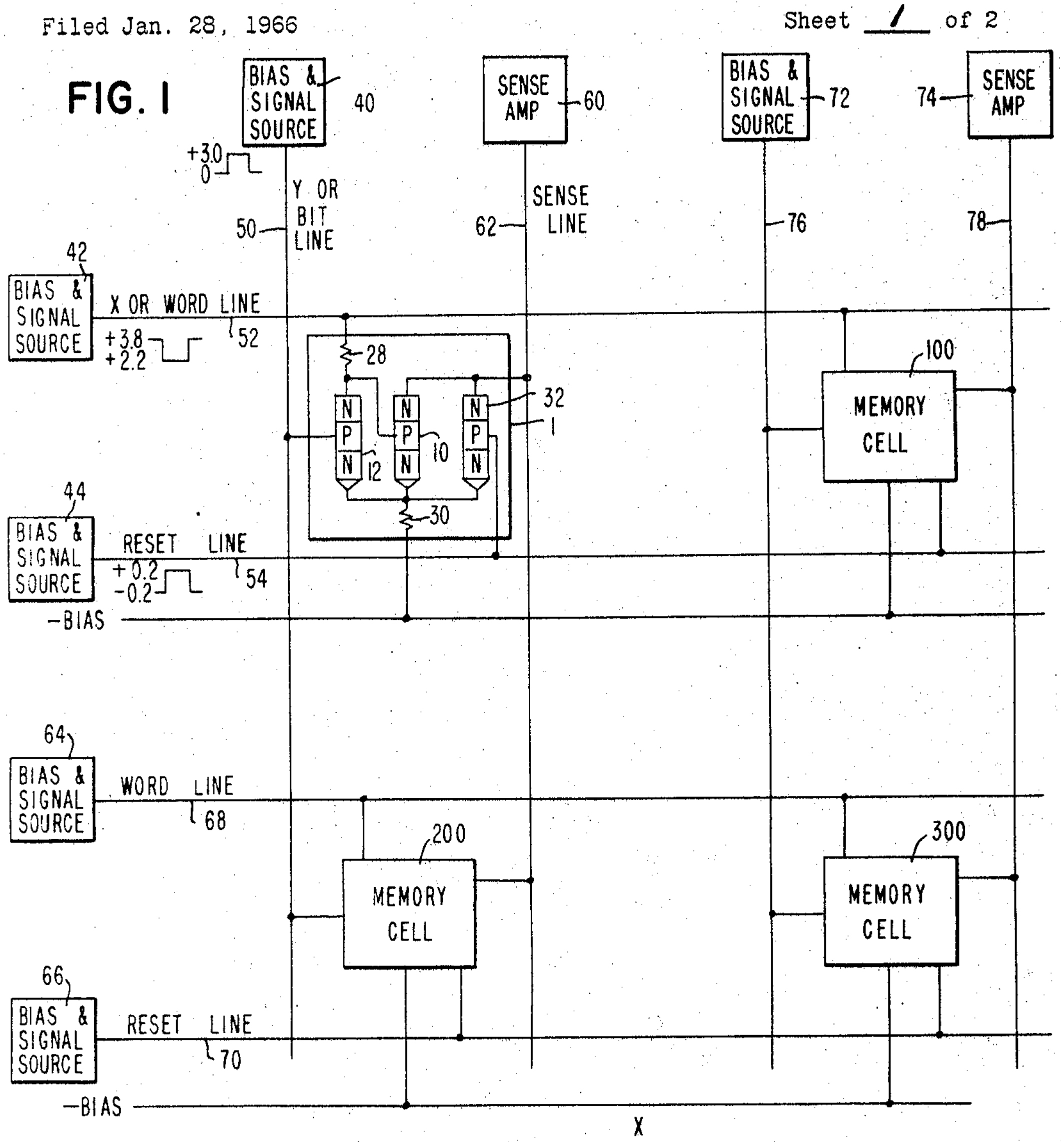
FIG. 1 is a schematic circuit diagram partly in block form of one embodiment of a memory element, in accordance with the present invention, shown connected in a matrix of identical memory elements.

Referring now to FIG. 1, a first memory cell configuration in accordance with the present invention is shown connected typically in a 2 x 2 matrix. The memory cell or element 1 is shown in detail within a box, and the other boxes 100, 200 and 300 represent other identical memory elements. The transistors of cell 1 are designated 10 and 12, which typically are of the N-P-N type, although it will be appreciated that the opposite polarity of transistor could also have been selected, that is, a transistor of the P-N-P type. Load resistor 28 is shown connected to the collector of transistor 12 and the common emitter resistor 30 is shown connected to a source of negative bias. The other end of resistor 30 is connected in common to the emitter of the transistors 10 and 12 and also to the emitter of a transistor 32, known as the reset transistor. The other memory elements 100, 200 and 300 likewise include identical transistor devices as described for the memory cell 1.

The line connected through resistor 28 to the collector of transistor 12 and to the base of transistor 10 is referred to as the X or Word Line and the line to the base of transistor 12 is referred to as the Y or Bit Line. The line to the collectors of transistors 10 and 32 is referred to as the Sense Line and the line to the base of transistor 32 as the Reset Line. An additional line labeled —Bias provides a source of negative bias for all of the transistors in the matrix.

Separate bias and signal sources 40, 42 and 44 are connected respectively to the Bit Line 50, Word Line 52 and Reset Line 54. A sense amplifier 60 is shown connected to the Sense Line 62. The bias and signal sources 42 and 44 are likewise connected to the other bit positions in a typical data word, and in the example shown in FIG. 1, to the other bit position represented by memory element 100. Similarly, other bias and signal sources 64 and 66 are connected via Word Line 68 and Reset Line 70 respectively, to the memory elements 200 and 300 in the exemplary matrix, such memory elements representing different bits in another data word. Bias and signal source 40 is also connected to memory element 200 via the Bit Line 50, and sense amplifier 60 is connected to memory element 200 via Sense Line 62.

In like fashion, bias and signal source 72 and sense amplifier 74 are connected via lines 76 and 78 to memory elements 100 and 300.

Considering now the operation of the circuit of FIG. 1, and, for simplicity, only the operation of cell 1, the Y or Bit Line 50 is normally held, for example at $V_0$ volts. The Reset Line 54 would be in its rest position, that is, at a potential slightly more negative than the potential on the Y Line. Under these conditions the reset transistor 32 will not conduct current and a cell can be selected, that is, written into, in the following manner. A negative pulse is applied from bias and signal source 42 on the X or Word Line 52, and a positive pulse is applied coincidently from bias and signal source 40 on the Bit Line 50, causing the base of transistor 12 to become more positive than the base of transistor 10, and causing a shift in the current from normally conducting transistor 10 to transistor 12. The parameters are chosen such that a pulse applied alone to either the Bit Line or the Word Line and will not cause the preceding operation to occur. A set of typical values is shown on FIG. 1 adjacent to cell 1. It should be noted that the term "coincidently" in this context refers to a pulse overlap as well as to an exact correspondence of time periods for the pulses.

In the reset operation the Reset Line is brought more positive than the Y or Bit Line. Thus, assuming that the Y Line is at a potential of 0 volts, the Reset Line, such as line 34, is brought to a potential just slightly greater than 0 volts. If transistor 12 has been conducting, that is, if cell 1 has been storing a "1," the pulser applied to the Reset Line will cause a switching of current to the reset transistor 32. When this happens the collector of transistor 12 and base of transistor 10 go positive. In accordance with one design, the base of transistor 10 will go more positive than the pulse applied to the Reset Line and thus, reset transistor 32 will stop conducting and the current will be taken over by transistor 10.

Figure 2:
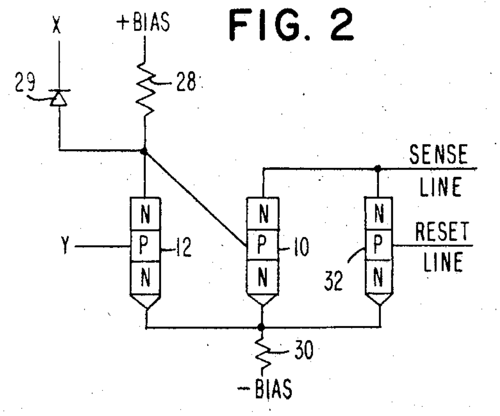
FIG. 2 is a schematic circuit diagram of another embodiment of a memory element.

In an alternative embodiment of the memory cell of the present invention the circuit is arranged to speed the operation of the memory all by means of a diode connection as shown in FIG. 2. The circuit is substantially the same as that depicted for cell 1 in FIG. 1, except that the X or Word Line is connected to the cathode of a diode 29. The anode of diode 29 is connected to the collector of transistor 12. The other circuit elements have been designated with the same numerals as were employed in FIG. 1. In this embodiment the resistor 28 has one end connected to the collector of transistor 12, but the other end of the resistor 28 is taken to a source of positive bias. The diode 29 speeds the operation of the memory cell by (a) limiting the excursion of the collector of transistor 12 and (b) by providing a low impedance drive to the collector of transistor 12 and the base of transistor 10 through the forward resistance of diode 29. Note that without the diode, the negative pulse on the X Line must charge circuit capacitance through resistor 28. In addition, the diodes permit the potential of the base of transistor 10 to be more precisely controlled. Without the diode the potential at the base of transistor 10 with transistor 10 conducting is determined by the base current drop of transistor 10 across resistor 28. The base current is in turn determined by the Beta of the transistor which is generally not a precisely controlled parameter.

It will be appreciated that only the details of an individual memory cell have been depicted in FIG. 2, but that the cell shown can be connected in a matrix of identical cells in the same manner as shown in the matrix of FIG. 1. Of course, for such a matrix, an additional line would be employed to supply the positive bias to the cells.

In the arrangement of FIG. 2 the same essential operation is retained as was followed with the previous cell 1 of FIG. 1, or, alternatively, the reset transistor 32 could be made to carry all the current until the reset pulse has been removed, that is, until the Reset Line has returned to its normal potential level, at which time transistor 10 would then go into conduction.

In the previous description of the reset operation, it was assumed that the condition existed that transistor 12 had been conducting, that is, that the cell had been storing a "1." However, let it now be assumed that the cell is storing a "0" and hence that transistor 10 is initially conducting. The reset level is chosen, relative to the potential at the base of transistor 10, such that, either the reset transistor 32 does not go into conduction or the reset input goes more positive than the base of transistor 10 and, hence, the reset transistor 32 takes over conduction from transistor 10. Of course, when the reset pulse terminates and the potential on the Reset Line returns to a slightly negative potential, transistor 10 goes into conduction again.

Figure 3:
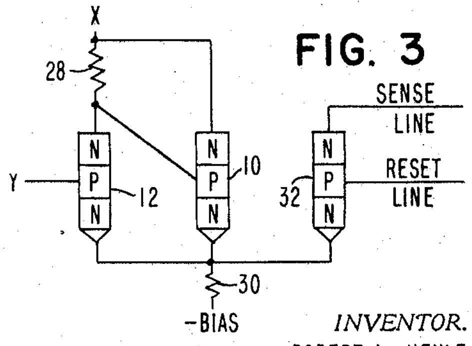
FIG. 3 is a schematic circuit diagram of yet another embodiment.

By modification of the basic circuit for the memory cell, a fixed threshold D.C. sense circuit can be utilized. This embodiment is shown in FIG. 3. In the circuit of FIG. 3, the configuration is much like that previously shown for cell 1 in FIG. 1. However, in FIG. 3, the collectors of transistor 10 and the reset transistor 32 have been separated and the current which flows in the reset transistor 32 is fed into the Sense Line. The collector of transistor 10 is connected to the X or Bit Line.

Since current only flows in the reset transistor 32 during some portion of the reset pulse period, this flow of current can be detected simply by a shift in D.C. level on the Sense Line, thereby simplifying the required sense circuitry over the case where a variable D.C. current flows in the Sense Line depending on the state of the cells which are connected to this line. In other words, referring back to FIG. 1, there would have been variable D.C. current flowing in the Sense Line, for example, Sense Line 62, depending on the number of cells that happened to be in the "0" state (transistors 10 of those cells conductive), all of the transistors 10 having their collectors connected to the Sense Line 62. In contrast, however, the arrangement of FIG. 3 is such that only when reset transistor 32 is putting out current is there current present on the Sense Line.

The addition of the reset transistor 32 in the memory cell of the present invention not only speeds up operation of the cell but permits the cell to be operated in a "bit organized" memory. The requirements on a so-called bit organized memory are that the cell be capable of being selected by X and Y coordinates for both reading and writing. The organization of this cell on a semiconductor chip, for example, would have all the cells on one chip connected to one Sense Line and addressed by X and Y coordinates. This type of organization can result in the fewest number of connections required to interconnect chips into a memory.

Figure 4:
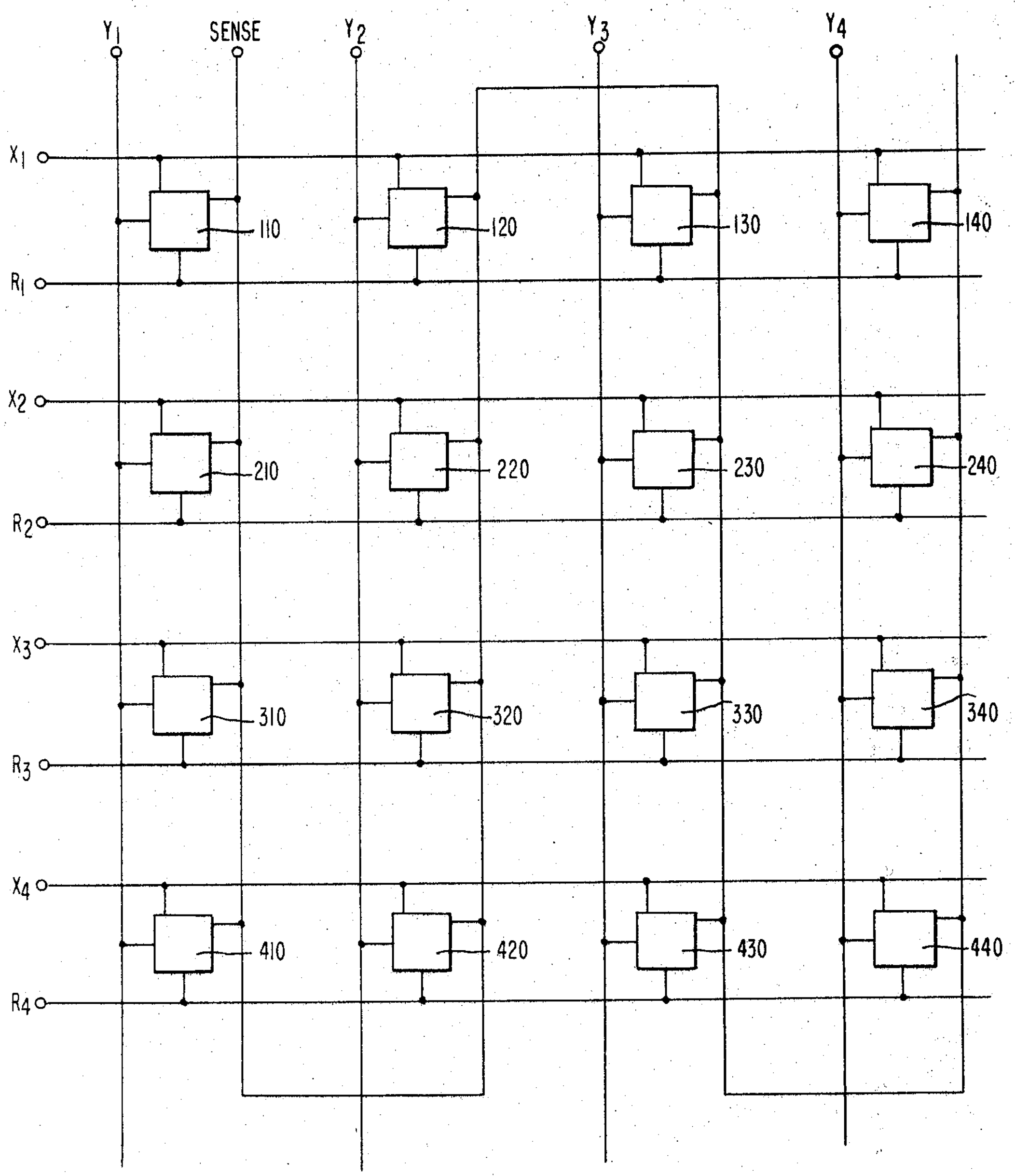
FIG. 4 is a schematic circuit diagram of a matrix of memory elements, each as illustrated in FIG. 3.

For an explanation of the aforenoted bit organized type of memory, let us consider the particular cell of FIG. 3 arranged in a 4 x 4 matrix as depicted in FIG. 4. This matrix is representative of a single plane in a three dimensional memory. The organization of a three dimensional memory is generally such that all the storage positions in one plane correspond to the same bit position in different words.

For the sake of clarity, the −Bias line has not been shown in FIG. 4, and further, the various bias and signal sources and sense amplifier have been simply depicted schematically as circles at the ends of the various lines. In addition, the several X Lines have been labeled $X_1$, $X_2$, $X_3$ and $X_4$, and the sevearl Y Lines and Reset Lines have been labeled in similar fashion. It should be noted that a significant difference in the planar array of FIG. 4 is that the Sense Line is connected to all of the memory cells in the array, and not, as was the case in the matrix of FIG. 1, to only the memory cells in a given column of the matrix, each representing the same bit position in different data words.

The following symbols will stand for the different conditions to be imposed on the X, Y and R lines in the matrix of FIG. 4. Thus, $X$=negative select on X line
$\overline{X}$=rest position of X line
$Y$=positive select on Y line
$\overline{Y}$=rest position of Y line
$R$=positive select on R line
$\overline{R}$=rest position of R line The following additional conditions are also to be satisfied in the design of the circuits: (1) The positive select potential of the Y line must exceed the positive select potential of the R line; (2) the positive potential at the base of transistor 10, when it is conducting, must exceed the potential of R select; (3) the pulse period for R must fall within (in time) the pulse period for Y.

Remembering the symbols previously noted above, the following conditions have to be met in order to change the state of the cell or to leave the state unaffected:

| | |
|---|---|
| Cell to one | $X\overline{R}Y$ |
| Cell to zero | $\overline{X}R\overline{Y}$ |
| Cell not to zero | $\overline{X}RY$ |

Thus, as before, in order to place a cell in the "1" state a negative-going pulse is applied to the X Line, and a positive-going pulse is applied coincidently to the Y Line, but the Reset Line is left at its normal potential which is slightly below 0. To set a given cell to the "0" state, that is, to reset a cell, the X and Y Lines are left at their normal potentials and only the Reset Line has a pulse applied to it, and this, of course, is a positive-going pulse which raises the potential on the Reset Line slightly above 0. However, since a group of cells representing the same bit positions in different data words are all connected to one Reset Line, it is necessary to be able to select only one cell for resetting. Hence, the Y line connected to those cells that are not to be reset must have a positive pulse applied thereto. This is the meaning of the condition "cell not to zero."

Consider now the matrix arrangement of FIG. 4. If for example, it is desired to write a "1" into cell 330, a negative-going pulse is applied to line $X_3$, and coincidently therewith, a positive-going pulse to line $Y_3$. This operation affects only the desired cell 330. Now, however, if it is desired to write a "0," for example, into cell 340, this is achieved by resetting the cell, that is, by applying a pulse to $R_3$. But simply applying a pulse to $R_3$ would also affect cells 310, 320 and 330, and this is not desired. Hence, there is first applied selects to $Y_1$, $Y_2$ and $Y_3$, that is, a positive pulse is first applied on the Y Lines to cells 310, 320 and 330 respectively. Following this, a pulse is applied to $R_3$ which then sets cell 340 to "0" but leaves cells 310, 320 and 330 unaffected. It is then necessary to remove the pulse on $R_3$ and follow this by the removal of the aforesaid pulses that have been applied to $Y_1$, $Y_2$ and $Y_3$.

The read out of a predetermined cell in the matrix of FIG. 4 is accomplished by following the above-described reset operation by means of which only a selected cell is affected by the pulse applied to the Reset Line. The read out is destructive in that it involves changing the state of a predetermined cell from a "1" to "0." It will be remembered that the Sense Line is connected to all the cells in the matrix of FIG. 4. Conditions are set such that the Sense Line will only have a signal when setting a predetermined cell from "1" to "0." This is achieved, as noted before, by the choice of the reset level, relative to the potential at the base of transistor 10, such that reset transistor 32 does not go into conduction if, at the time of reading out the cell, the cell is in the "0" state with transistor 10 conductive. Only if transistor 12 is conductive ("1" state) when the reset pulse is applied, will reset transistor 32 go into conduction momentarily, thereby producing a pulse output on the Sense Line.

What has been described herein is a simply constructed memory cell which by the addition to the basic feedback current switch of another transistor having its emitter connected in common with the emitters of the bistable elements of the memory cell, enables resetting of the cell with very small amplitude voltages. Such arrangement permits extremely high speed operation in the resetting of the memory cell. Also described has been a memory cell embodiment which enables the use of a very simple fixed threshold D.C. sense circuit in order to sense the state of a cell. An additional feature described has been the matrix arrangement of a plurality of memory cells in a "bit organized" memory system.

While there have been shown and described and pointed out the fundamental novel features of the invention as applied to the preferred embodiments, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claims.

What is claimed is:

1. A memory system comprising a plurality of memory cells, each memory cell comprising at least first, second and third transistors, the collector of the first of said transistors being directly connected to the base of the second transistor, a load impedance connected to the collector of said first transistor, and a common impedance connected to the emitters of said first, second and third transistors, each memory cell having two quiescent states, a first state in which said first transistor is conductive and the second transistor is nonconductive, and a second state in which the second transistor is conductive and the first transistor is nonconductive, said first state defining the storage of a "1" by said cell, and the second state defining the storage of a "0,"

at least three lines connected to each of the memory cells, one of said lines being connected to the base of said third transistor, means, connected to each of said three lines, for selectively applying pulses to the bases respectively of each of said first, second and third transistors in each of said memory cells.

2. A memory system as defined in claim 1, further including means for applying pulses coincidently to said first and second lines, the direction of said pulses being opposed.

3. A memory system as defined in claim 1, further including means for resetting a cell to its "0" state, said means being connected to said third line, said means including a pulse source for providing a pulse of sufficient magnitude to switch current initially from the conductive one of said first and said second transistors in said cell to said third transistor and thereafter to leave said second transistor in the conductive state.

4. A memory system as defined in claim 3, wherein said second and third transistors have their collectors connected together.

5. A memory system as defined in claim 3, further including a fourth line connected to the collector of said third transistor.

6. A memory system as defined in claim 3, further including a fourth line connected to the collectors of both of said second and third transistors.

7. A memory system as defined in claim 3, further including a fourth line connected to the collector of only said third transistor, said second transistor having its collector connected to said first line.

8. A memory system as defined in claim 1, further including diode means having one end connected to said first line and the other end to the collector of said first transistor, and fixed bias means connected to said load impedance.

9. A memory system as defined in claim 1, including means for resetting said cell, the reset potential level being selected, relative to the potential at the base of said second transistor, such that said third transistor does not go into conductor if said second transistor is already conductive.

10. A bit organized memory comprising a plurality of memory cells in a predetermined planar array, each memory cell comprising first, second and third transistors, the collector of only said first transistor being directly connected to the base of said second transistor, a load impedance connected to the collector of said first transistor, and a common impedance connected to the emitters of each of said first, second and third transistors, each memory cell having two quiescent states, a first state in which said first transistor is conductive and said second transistor is nonconductive, and a second state in which said second transistor is conductive and said first transistor is nonconductive, said first state defining a storage of a "1" by said cell and the second state defining the storage of a "0,"

at least three lines connected to each of the memory cells, said lines being connected to the bases respectively of said first, second and third transistors, a fourth line connected to all of the memory cells in said planar array, said fourth line being connected to the collector of each of said third transistors in each of said memory cells.

11. A bit organized memory as defined in claim 10, further including means for applying pulses coincidently to said first and second lines connected to a predetermined cell, the direction of said pulses being opposed, whereby a "1" is written into said predetermined cell.

12. A bit organized memory as defined in claim 10, further including means for resetting only a predetermined cell to its "0" state, said means including X and Y coordinate lines and a first pulse source for providing a pulse of sufficient magnitude to the base of said third transistor to cause said third transistor to reset said cell, said pulse source also being connected to other memory cells corresponding to other bits in different data words, and means for preventing the resetting of said other cells by said first pulse source, said means including a second pulse source for applying coincidently a pulse to said first line connected to each of said other memory cells.

References Cited

UNITED STATES PATENTS 3,364,362 1/1968 Mellott -------------- 307—88

TERRELL W. FEARS, *Primary Examiner.*

U.S. Cl. X.R.

307—238; 340—172.5

U.S. DEPARTMENT OF COMMERCE

PATENT OFFICE

Washington, D.C. 20231

UNITED STATES PATENT OFFICE

CERTIFICATE OF CORRECTION

Patent No. 3,441,912 April 29, 1969

Robert A. Henle

It is certified that error appears in the above identified patent and that said Letters Patent are hereby corrected as shown below:

Column 5, line 5, "sevearl" should read -- several --. Column 7, line 19, "conductor" should read -- conduction --.

Signed and sealed this 14th day of April 1970.

(SEAL)
Attest:

Edward M. Fletcher, Jr.
Attesting Officer

WILLIAM E. SCHUYLER, JR.
Commissioner of Patents